(12) United States Patent
Ahmed et al.

(10) Patent No.: US 9,845,164 B2
(45) Date of Patent: Dec. 19, 2017

(54) SYSTEM AND METHOD OF MONITORING AN INDUSTRIAL PLANT

(71) Applicant: Yokogawa Electric Corporation, Tokyo (JP)

(72) Inventors: Syed Nabil Ahmed, Bangalore (IN); Harsha Rahul Boggaram Krishna Prasad, Bangalore (IN); Periaswamy Subramanian, Bangalore (IN); Alaguraja Pandian, Bangalore (IN); Nivashkumar Ramachandran, Bangalore (IN)

(73) Assignee: Yokogawa Electric Corporation, Tokyo (JP)

( * ) Notice: Subject to any disclaimer, the term of this patent is extended or adjusted under 35 U.S.C. 154(b) by 79 days.

(21) Appl. No.: 14/992,434

(22) Filed: Jan. 11, 2016

(65) Prior Publication Data
US 2016/0282872 A1    Sep. 29, 2016

(30) Foreign Application Priority Data

Mar. 25, 2015    (IN) .......................... 1539/CHE/2015

(51) Int. Cl.
*B64D 47/08* (2006.01)
*B64C 39/02* (2006.01)
*G05D 1/10* (2006.01)

(52) U.S. Cl.
CPC ............ *B64D 47/08* (2013.01); *B64C 39/024* (2013.01); *G05D 1/101* (2013.01);
(Continued)

(58) Field of Classification Search
CPC . B64D 47/08; B64C 39/024; B64C 2201/127; B64C 2201/141; B64C 2201/146; G05D 1/101
See application file for complete search history.

(56) References Cited

U.S. PATENT DOCUMENTS 9,389,084 B1 * 7/2016 Chen ....................... G01C 11/06
9,513,635 B1 * 12/2016 Bethke ................... G01C 21/20
(Continued)

FOREIGN PATENT DOCUMENTS

GB          2533140 A  *  6/2016  ............... G05D 1/00

*Primary Examiner* — Calvin Cheung
(74) *Attorney, Agent, or Firm* — Sughrue Mion, PLLC

(57) ABSTRACT

This disclosure is related to an industrial plant monitoring system configured to monitor equipment an industrial plant. The industrial plant monitoring system includes one or more processors, an autonomous vehicle including at least one sensor, a plant information management system including a navigation module, a communication module, and an analysis module. The navigation module is configured to retrieve a trajectory from a trajectory database. The sensors present on the autonomous vehicle are configured to collect sensor data related to the equipment. The communication module is configured to receive the sensor data from sensors and transmit the sensor data to a plant information management system. The analysis module is configured to receive the sensor data from the communication module, the analysis module being configured to detect an event related to the industrial plant based on the sensor data and historic sensor data.

24 Claims, 11 Drawing Sheets

(52) U.S. Cl.
CPC .. *B64C 2201/127* (2013.01); *B64C 2201/141* (2013.01); *B64C 2201/146* (2013.01)

(56) References Cited

U.S. PATENT DOCUMENTS

| | | | | |
|---|---|---|---|---|
| 9,540,102 | B2* | 1/2017 | Levien | B64C 39/024 |
| 9,542,849 | B1* | 1/2017 | Bertram | G08G 5/003 |
| 9,599,994 | B1* | 3/2017 | Bogdanowicz | G05D 1/104 |
| 9,728,089 | B2* | 8/2017 | Marcus | G08G 5/0034 |
| 2009/0210109 | A1* | 8/2009 | Ravenscroft | G01C 21/005 |
| | | | | 701/26 |
| 2009/0219393 | A1* | 9/2009 | Vian | G07C 5/008 |
| | | | | 348/144 |
| 2009/0265193 | A1* | 10/2009 | Collins | G06Q 30/0185 |
| | | | | 705/4 |
| 2010/0224732 | A1* | 9/2010 | Olson | H04W 4/046 |
| | | | | 244/190 |
| 2012/0245834 | A1* | 9/2012 | Klooster | G08G 5/0034 |
| | | | | 701/120 |
| 2013/0231803 | A1* | 9/2013 | Barraci | G01C 23/00 |
| | | | | 701/3 |
| 2013/0317667 | A1* | 11/2013 | Kruglick | B64C 39/024 |
| | | | | 701/2 |
| 2014/0018979 | A1* | 1/2014 | Goossen | G08G 5/0034 |
| | | | | 701/3 |
| 2015/0261217 | A1* | 9/2015 | Gil | G05D 1/0038 |
| | | | | 701/2 |
| 2015/0304869 | A1* | 10/2015 | Johnson | H04W 24/08 |
| | | | | 701/2 |
| 2016/0050011 | A1* | 2/2016 | Frolov | H04B 7/18506 |
| | | | | 455/431 |
| 2016/0088286 | A1* | 3/2016 | Forsythe | G06F 17/30528 |
| | | | | 348/46 |
| 2016/0116915 | A1* | 4/2016 | Pulleti | G01S 13/56 |
| | | | | 701/3 |
| 2016/0140851 | A1* | 5/2016 | Levy | G08G 5/0069 |
| | | | | 701/3 |
| 2016/0144982 | A1* | 5/2016 | Sugumaran | B64C 25/32 |
| | | | | 244/103 R |
| 2016/0189550 | A1* | 6/2016 | Chan | G08G 5/0043 |
| | | | | 701/3 |
| 2016/0266579 | A1* | 9/2016 | Chen | G05D 1/0038 |
| 2016/0292933 | A1* | 10/2016 | Sprock | G07C 5/008 |
| 2016/0314545 | A1* | 10/2016 | Jessen | G06Q 30/0278 |
| 2016/0321763 | A1* | 11/2016 | Shike | G06Q 10/06313 |
| 2016/0357183 | A1* | 12/2016 | Shaw | G05D 1/0027 |
| 2016/0360562 | A1* | 12/2016 | Chong | H04W 4/025 |
| 2017/0022015 | A1* | 1/2017 | Gollu | G05B 15/02 |
| 2017/0024929 | A1* | 1/2017 | Priest | H04W 24/02 |
| 2017/0069214 | A1* | 3/2017 | Dupray | G08G 5/0021 |
| 2017/0103659 | A1* | 4/2017 | Jin | G08G 5/006 |

\* cited by examiner

FIG. 3

| X | Y | Z | ACTION | TIME | HOVER | CHECK | WIFI | SENSOR TYPE |
|---|---|---|--------|------|-------|-------|------|-------------|
| 0 | 0 | 0 | LAUNCH | 00:00 | NO | – | YES | |
| 1 | 1 | 1 | MEASUREMENT | 01:50 | YES | QR CODE | NO | VIBRATION |
| 1 | 1 | 2 | PATROL | 02:00 | NO | VIDEO | NO | |
| 1 | 0 | 0 | MEASUREMENT | 03:00 | YES | ROUNDEL | NO | VIBRATION |
| 2 | 0 | 2 | LAND | 03:30 | NO | – | YES | |

SYSTEM AND METHOD OF MONITORING AN INDUSTRIAL PLANT

FIELD OF THE INVENTION

The disclosure is directed generally to the field of automation in industrial plants. In particular, the disclosure is directed toward monitoring an industrial plant during operations.

BACKGROUND

In industrial plants such as petrochemical refineries, chemical plants and power generation plants, a Distributed Control System, hereinafter referred to as DCS, is used to control process operations by the use of control elements placed throughout the physical systems. The DCSs are connected to various field devices such as various measurement devices for pressure, temperature, and flow transmitters in order to measure various parameters related to a processes. The DCSs are also connected to actuators and control values using setpoint control to control parameters related to processes. The field devices transmit measure various parameters and transmit them to the DCS in real-time. The field devices are connected to the DCS using a process control network system such as FOUNDATION™ Fieldbus. The DCS is operated by a human operator, a console operator, who monitor the real-time values transmitted from field devices and control these devices and in turn the process in operation. The console operator views the process parameters on a Human Machine Interface (HMI). Another actor in the operations of an industrial plant is a field operator, who performs various tasks in physical equipment present in the industrial plant. Field operator is responsible for identifying risks and mitigating them in physical equipment present in the industrial plant. The roles of field operator involve performing maintenance routines and regular inspection of the physical equipment present in the plant.

In case of a petrochemical refinery, the refinery is spread over a large geographical area and has a large number of field devices. Day-to-day operations in a petrochemical refinery involve communication between the console operator and the field operator. The field operator may ask the console operator for assistance to perform his tasks. The console operator may also instruct the field operator to perform maintenance related tasks when the console operator diagnoses a problem with the use of DCS such as shutting down manual valves. The field operator may be required to work in challenging environments such as rainy, heat or cold outdoor conditions. The field operator also routinely performs visual inspection of equipment present in the industrial plant for detecting problems such as gas leaks, oil spill, or unusual sounds. These unusual signs may indicate a potential problem with the equipment present in the plant. There are some scenarios when the field operator needs assistance from the console operator in locating a particular valve in a large industrial plant such as a petrochemical refinery. In cases of emergency situations, sending a field operator to perform visual inspection has two disadvantages. One is that it takes time for the field operator to reach the destination. The other disadvantage is that sending a human field operator puts the person at a risk of a physical injury or exposure to harmful gases or radiation.

The petrochemical refinery has large metal structures such as pipes that are spread over a large geographical area. Therefore, to reach locations precisely, the field operator may require assistance from the console operator. A Global Positioning System, hereinafter referred to as GPS, will not work in a petrochemical refinery at all locations, especially indoor locations, due to the lack of line of sight required for a GPS receiver to work. Line of sight is unavailable in indoor conditions and outdoor areas where large metal structures block the line of sight.

SUMMARY

The present disclosure relates to a method for monitoring an industrial plant in accordance with an embodiment. The method includes retrieving, by a navigation module, a trajectory from a trajectory database. An autonomous vehicle is navigated, by the navigation module, to a waypoint present in the trajectory, wherein the waypoint is identified with respect to a model of the industrial plant. Subsequently, collecting sensor data by sensors present on the autonomous vehicle. The collected sensor data is transmitted by the communication module. The analysis module detects an event related to the industrial plant based on collected non-historic sensor data and historic sensor data.

According to an embodiment, the trajectory may be associated with one or more waypoints travelled by the autonomous vehicle.

In some embodiments, examples of autonomous vehicles may include, but are not limited to, unmanned aerial vehicle and an unmanned ground vehicle. The waypoints may represent a plant safety zone or and a location of equipment in the industrial plant.

In another embodiment, the method further includes comparing non-historic sensor data with the one of the historic sensor data to identify a deviation between the last-received one and the historic sensor data.

In another embodiment, the event is detected based on a magnitude of the deviation identified. In a further embodiment, the method includes generating a recommended action corresponding to the magnitude of the deviation identified.

In an embodiment, the autonomous vehicle identifies the waypoint using at least one visual marker located at the waypoint. The visual marker includes optical machine-readable data.

In some embodiments, the sensor may be at least one of an infrared camera, a gas analyser, a vibration sensor, a sound sensor, an ultrasound sensor, and a Radio-Frequency Identification tag reader.

In an embodiment, the sensor is configured to communicate with a field device in the industrial plant using near field communication (NFC).

The present disclosure also relates to an industrial plant monitoring system configured to monitor an industrial plant, according to an embodiment. The system includes one or more processors, a navigation module, a communication module, and an analysis module. The navigation module is configured to retrieve a trajectory from a trajectory database and navigate an autonomous vehicle including at least one sensor to a waypoint using the retrieved trajectory, wherein the waypoint is identified with respect to a three dimensional model of the industrial plant. The communication module is configured to receive sensor data from the at least one sensor. The analysis module is configured to receive the sensor data from the communication module, the analysis module being configured to detect an event related to the industrial plant based on collected non-historic sensor data and historic sensor data, wherein the navigation module, the communication module and the analysis module are implemented by the one or more processors.

In some embodiments, the autonomous vehicle may include one or more sensors. Examples of sensors include, but are not limited to, an infrared camera, a gas analyser, a vibration sensor, a sound sensor, an ultrasound sensor, and a Radio Frequency Identification tag reader. In yet another embodiment, the autonomous vehicle may include navigation module and the communication module.

In an embodiment, the navigation module is configured to identify the waypoint using at least one visual marker present at the waypoint. The visual marker may include, but is not limited to, optical machine-readable data such as Quick Response code, Bar Code, and Roundel. The communication module is configured to transmit the received sensor data when the autonomous vehicle is located in at least one waypoint. The communication module is further configured to transmit the sensor data using at least one of Wireless Local Area Network, Wireless Mobile Network, or Bluetooth protocol, according to this embodiment.

In another embodiment, a Human Machine Interface (HMI) allows for configuring a trajectory travelled by the autonomous vehicle, wherein the trajectory is associated with one or more waypoints.

In some embodiments, the navigation module is configured to generate an alert to a Human Machine Interface in response to an external interference to the movement of the autonomous vehicle in the trajectory.

The present disclosure also relates to autonomous vehicle configured to communicate with a plant information management system including an analysis module and a trajectory database, according to an embodiment. The navigation module is configured to a navigation module configured to retrieve a trajectory from the trajectory database and navigate the autonomous vehicle to a waypoint using the retrieved trajectory, wherein the waypoint is identified with respect to a model of the industrial plant. The autonomous vehicle includes sensors configured to collect sensor data. The communication module is configured to communicate with the at least one sensor and transmit the sensor data to the analysis module.

In an embodiment, the communication module is further configured to transmit the sensor data to a master database.

In some embodiments, the autonomous vehicle includes a camera configured to capture a video clip of the waypoint.

DETAILED DESCRIPTION

FIG. 3 is a diagram representing the schema of a trajectory database according to some embodiments of the present invention.

Figure 1:
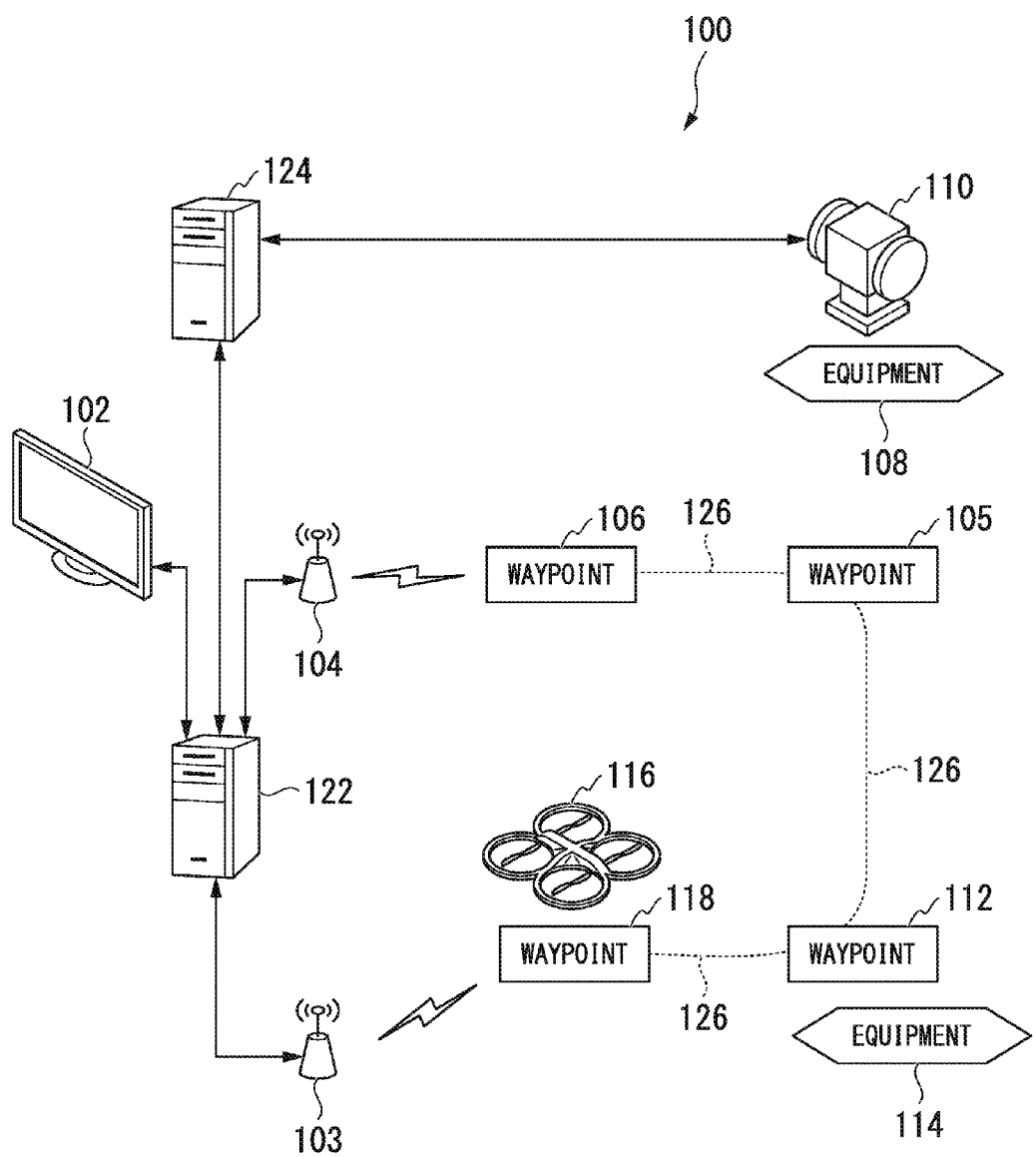
FIG. 1 is a diagram of an example of an environment where some embodiments of the present invention reside.

For the purpose of describing illustrative embodiments of the present invention, certain terms are defined below. Except where expressly defined, terms within the specification and claims shall be understood to have the meaning that is apparent to one of ordinary skill in the art.

"Autonomous Vehicle" refers to land, air or water based vehicles that are capable of sensing and navigating their environment without human input. Some examples of autonomous vehicles may include, but are not limited to, unmanned aerial vehicles, unmanned ground vehicles, and unmanned underwater vehicles.

"Unmanned aerial vehicle" refers to an aircraft that can fly autonomously based on predetermined trajectory. An example of unmanned aerial vehicle is, but not limited to, quadcopter that has four rotors. The small size of quadcopters allows them to operate in indoor environments such as industrial plants. They can be flown in outdoor environments as wells.

"Waypoint" refers to a reference point in physical space used for purposes of navigation, for example, a destination. The waypoint may represent a point of interest in three dimensional coordinates. It may be identified using the 3D Cartesian coordinate system. In some cases, latitude and longitude values may be used in combination to identify a specific point in a 2D-space. In other cases, the latitude, longitude and altitude values may be used in combination to identify a specific point in a 3D-space.

"Sensor" refers to a device that is used to sense or detect one or more characteristic parameters of an environment or a location. Some example of the environment may include, but is not limited to, indoor environments such as industrial plants and outdoor environments as well. Some example of the location may include, but is not limited to, indoor locations in the indoor environments such as industrial plants and outdoor locations in the outdoor environments as well. Some example of the sensors may include, but is not limited to, infrared cameras, smoke sensors, electrochemical gas sensors, gas analysers, vibration sensors, sound sensors, ultrasound sensors, and Radio-Frequency Identification tag readers.

"Sensor data" refers to any digital data generated using the sensor that has been referred to as previously mentioned. "Non-historic sensor data" refers to the sensor data which has been generated last by the sensor and "Historic sensor data" refers to the sensor data which had been generated by the sensor before the non-historic sensor data was generated.

"Visual Marker" refers to a visually recognizable identifier such as a pattern, shape or symbol that includes optical machine-readable data, used to identify a location, a device or equipment in an industrial plant. Some examples of the visual marker may include, but are not limited to, Quick Response codes, Bar codes, and Roundels.

"Trajectory" refers to a path followed by a moving object through space as a function of time. An example of the trajectory may include, but is not limited to, a path taken by an autonomous vehicle such as unmanned aerial vehicle to reach from one destination to another.

"Event" refers to a signal generated by a computer in response to operations by operators, or to an action or occurrence detected by a computer program. An example of an event is may be, but is not limited to, a change in setpoint value by a console operator.

"Plant Information Management System" refers to a set of two or more subsystems that include process historians, data reconciliation, operations activity management, condition-based maintenance, emissions and environmental monitoring, energy management, performance calculations and monitoring, inventory management, material tracking, mass/energy balance, and production accounting.

"Three dimensional plant model" or "three dimensional model" refers to a representation of objects in three dimensional Cartesian coordinates. The model may include, but is not limited to, the surface and boundary of the objects contained within and the measurements thereof. These models can be created using computer aided design software. The various equipment and hardware are added during the commissioning of an industrial plant are represented in the three dimensional plant model by the use of computer aided design software.

"Model repository" refers to a memory storage space for storing three dimensional model of various physical locations, piping and equipment present in the industrial plant. The model repository is accessible over a communication network.

"Distributed Control System" refers to a control system used to control process operations by the use of control elements placed throughout the physical systems. In general, distributed control systems are connected to various field devices such as measurement devices for pressure, temperature, and flow transmitters in order to measure various parameters related to a processes.

FIG. 1 is a diagram of an example of an environment 100 where some embodiments of the present invention reside.

As shown in FIG. 1 the environment 100 represents a portion of an industrial plant (not shown) in an embodiment of the present invention. The industrial plant includes pieces of equipment 108 and 114 that may be monitored, in accordance with an embodiment of the present invention. Examples of equipment 108 and 114 may include a reactor in case of hydrocracking unit in a petrochemical refinery or a steam turbine in case of a power generation plant. Waypoints 105, 106, 112 and 118 shown in FIG. 1 represent specific locations in the industrial plant. Waypoints 105, 106, 112 and 118 represent a point of interest in the industrial plant and this includes the start and end points of a trajectory 126 travelled by an autonomous vehicle 116. The autonomous vehicle 116 is capable of moving within the industrial plant for monitoring the equipment 108 and 114 without human assistance. The autonomous vehicle performs computational operations involved in navigation and executing navigation instructions using a computing device that includes a processor, memory and communication interfaces. Examples of autonomous vehicle may include, but are not limited to, unmanned aerial vehicle, commonly known as drones or quadcopter and unmanned ground vehicle.

In another embodiment of the present invention, a Plant Information Management System (PIMS) 122 is a server located in the industrial plant to receive and archive information sent from various devices present in the industrial plant such as a pressure transmitter 110. The server is a computing device that includes a processor, memory and communication interfaces. Examples of field devices may include, but are not limited to, pressure transmitters, temperature sensors and flow meters. The field devices such as a pressure transmitter 110 are connected to a Distributed Control System (DCS) 124. Distributed control systems are connected to various field devices such as various measurement instruments for pressure, temperature, and flow measurement in order to measure various parameters related to a process. The DCS 124 is connected to the PIMS 122 using a communication network (not shown). The PIMS 122 is connected to a Human Machine Interface (HMI) 102 that allows a console operator to view information from the DCS 124 and PIMS 122. The HMI 102 is also used by the console operator to perform various actions related to controlling the operations of a process in the industrial plant.

An autonomous vehicle 116 can communicate with the PIMS 122 by the use of wireless access points 103 and 104. The wireless access points 103 and 104 can be accessed from only certain areas of the industrial plant due to safety regulations. In this embodiment, the certain areas that allow access the wireless access points 103 and 104 are the waypoints 118 and 106. These waypoints 118 and 106 are in proximity to the wireless access points 103 and 104. In an embodiment of the invention as shown in environment 100, the autonomous vehicle is stationed near the waypoint 118 and within the range of the wireless access point 120.

In an embodiment of the present invention, the dotted lines represent a trajectory 126 travelled by the autonomous vehicle 116. The trajectory passes through the waypoints 118, 112, 105 and 106. The waypoints 118 and 106 are respectively the start and end points of the trajectory 126. As shown in FIG. 1, another wireless access point 103 whose range encompasses the waypoint 106 is in the trajectory 126. The wireless access point 103 is available so that the autonomous vehicle 116 can transmit information when it reaches the waypoint 106 after monitoring the equipment 114 and 108.

In another embodiment of the present invention, the waypoints 112 and 105 are located near equipment 114 and 108 respectively. The proximity of the waypoints 112 and 105 to the equipment 114 and 108 is to allow the autonomous vehicle 116 to monitor the equipment while the autonomous vehicle travels through the trajectory 126.

Figure 2A:
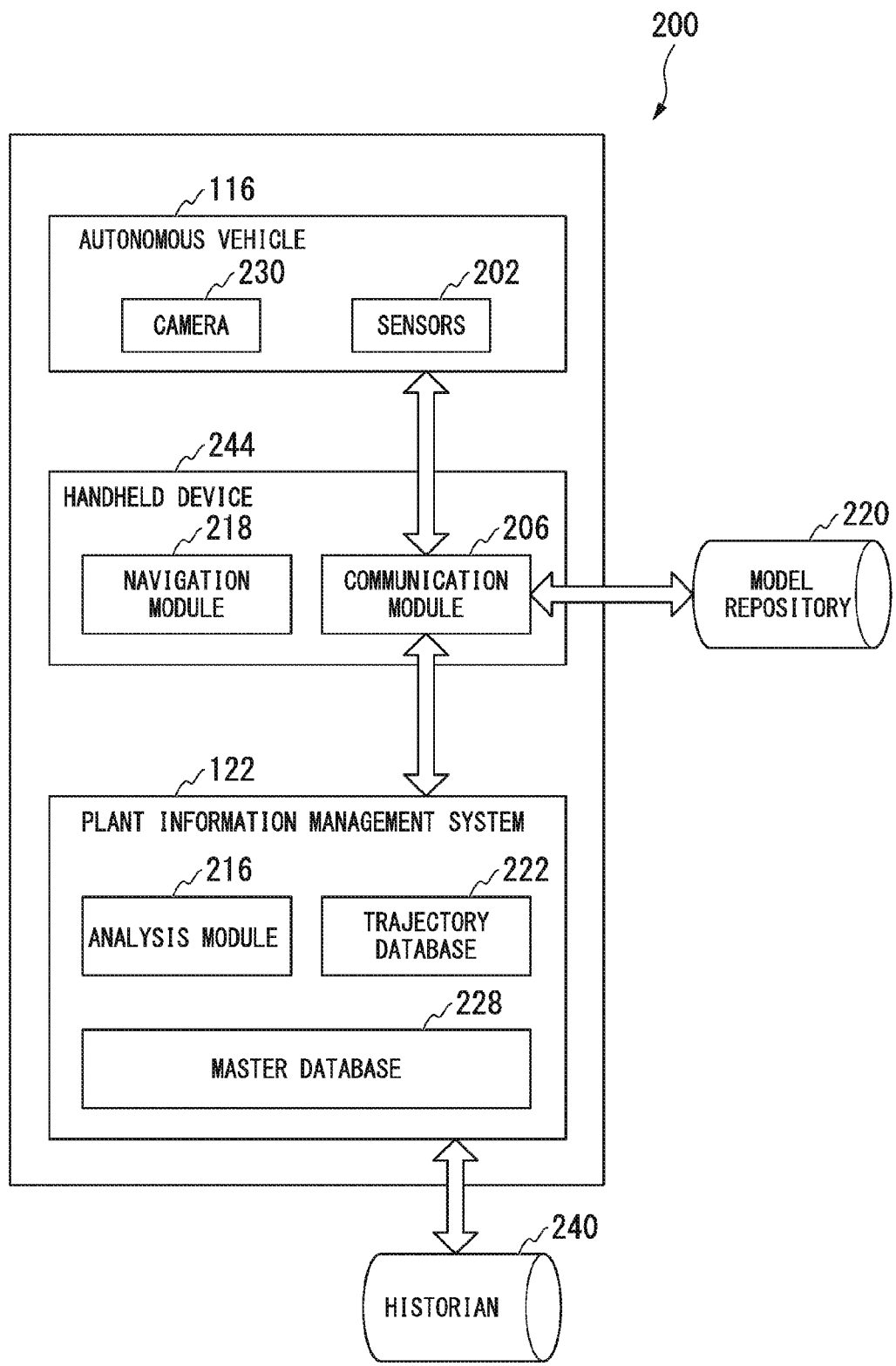
FIG. 2A is a block diagram of a system for monitoring an industrial plant, according to some embodiments of the present invention.

FIG. 2A is a block diagram of a system for monitoring an industrial plant, according to some embodiments of the present invention. According to an embodiment of the present invention, the system includes an autonomous vehicle 116, a handheld device 244 and a Plant Information Management System (PIMS) 122. The autonomous vehicle 116 may include a camera 230, a plurality of sensors 202. The handheld device 244 may include a navigation module 218 and a communication module 206. The handheld device is a computing device capable executing instructions stored in its memory. Some examples of handheld device may include, but is not limited to, a smart phone or a tablet. The PIMS 122 may include an analysis module 216, a master database 228 includes, not limited to, alarm database, sequence of events, and alarm reports and a trajectory database 222. The trajectory database 222 includes, but not limited to, location of waypoints and predetermined actions to be performed by the autonomous vehicle 116. The PIMS 122 is in communication with a historian 240 to access various parameters related to the operations of the industrial plant. The handheld device 244 is in communication with a model repository 220. The historian 240 stores various process parameters at set time intervals and also stores long term plant history.

According to this embodiment, the handheld device 244 retrieves a three dimensional model of the industrial plant from the model repository 220. The model repository 220 stores the information about the physical attributes of the plant building and equipment and their respective locations in three dimensional coordinates. The autonomous vehicle 116 receives navigation information including its path in a trajectory 126 from the navigation module 218 in the handheld device 244. The handheld device 244 also communicates with the trajectory database 222 present in the PIMS 122 during an operation to monitor the industrial plant. The handheld device 244 communicates with the PIMS 122 using its communication module 206 that is capable of sending and receiving data over a wireless network (not shown). The structure of the trajectory database 222 is explained below in conjunction with FIG. 3. The handheld device 244 communicates with the PIMS 122 and the model repository 220 by using the communication module 206. The communication module 206 communicates with both the PIMS 122 and model repository 220 using the wireless network established using wireless access points 103 and 104. The data received from sensors 202 is referred to as a sensor data and it is received by the communication module 206 in the handheld device 244 from the autonomous vehicle 116. In this embodiment, the handheld device 244 is constantly in communication with autonomous vehicle 116 in order to navigate the autonomous vehicle 116 through the trajectory 126. Even though the autonomous vehicle 116 is guided using the navigation module 218 present on the handheld device 244, its operations remain autonomous and independent of human actors and guided only by the trajectory 126. The sensor data is communicated to the handheld device 244 and in turn the communication module 206 transmits the sensor data to the PIMS 122 to be stored in the master database 228 present in the PIMS 122.

Figure 2B:
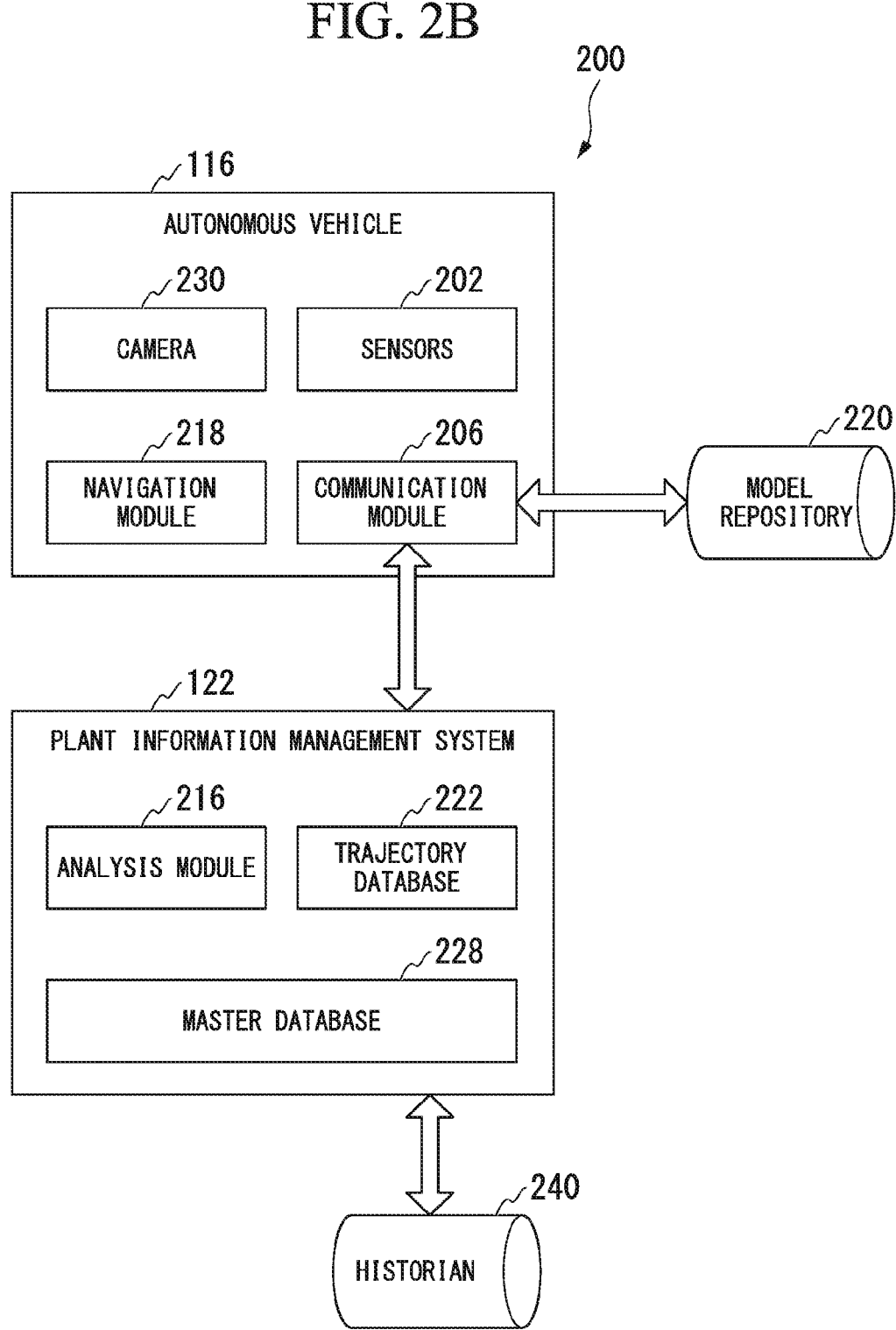
FIG. 2B is a block diagram of a system for monitoring an industrial plant, according to another embodiment of the present invention.

FIG. 2B is a block diagram of a system for monitoring an industrial plant, according to another embodiment of the present invention. According to an embodiment of the present invention, the system includes an autonomous vehicle 116 and the Plant Information Management System (PIMS) 122. The autonomous vehicle 116 may include a camera 230, a plurality of sensors 202, a navigation module 218 and a communication module 206. The PIMS 122 may include an analysis module 216, a master database 228 includes, not limited to, alarm database, sequence of events, and alarm reports and a trajectory database 222 includes, but not limited to location of waypoints and predetermined actions to be performed by the autonomous vehicle 116. The PIMS 122 is in communication with a historian 240 to access various parameters related to the operations of the industrial plant. The autonomous vehicle 116 is in communication with a model repository 220. The historian 240 stores various process parameters at set time intervals and also stores long term plant history.

According to this embodiment, the autonomous vehicle 116 receives a three dimensional model of the industrial plant from the model repository 220. The model repository 220 stores the information about the physical attributes of the plant building and equipment and their respective locations in three dimensional coordinates. The autonomous vehicle 116 retrieves a trajectory 126 from the trajectory database 222 present in the PIMS 122 during its operation to monitor the industrial plant. The structure of the trajectory database 222 is explained below in conjunction with FIG. 3. The autonomous vehicle 116 communicates with the PIMS 122 and the model repository 220 by using the communication module 206 present on-board the autonomous vehicle. The communication module 206 communicates with both the PIMS 122 and model repository 220 using a wireless network established using wireless access points 103 and 104. The data received from sensors 202 is referred to as a sensor data and it is transmitted by the communication module 206 to the PIMS 122 to be stored in the master database 228 present in the PIMS 122.

FIG. 3 is a diagram representing database schema of a trajectory database 222 according to some embodiments of the present invention. In an embodiment of the present invention, the database schema of the trajectory database 222 includes the following attributes represented by the columns in the table shown in FIG. 3. The attributes are coordinates for X-axis 302, Y-axis 304, Z-axis 306, action 308, time 310, hover 312, check 314, WIFI 316, Sensor type 318. The X 302, Y 304 and Z 306 coordinates represent the location of each waypoint in three dimensions with reference to the three dimensional plant model for an autonomous vehicle 116 to navigate. The action 308 attribute represents an action that is performed by the autonomous vehicle 116 while present at the location of the waypoint represented by the corresponding X 302, Y 304 and Z 306 coordinates. This action may indicate the use of one or more sensors 202 or the camera 230. The time 310 attribute represents the scheduled time at which the action 308 is to be performed. The time 310 attribute enables the autonomous vehicle 116 to regularly monitor the industrial plant at each instance when the current time matches the time 310 attribute value, for example, 00:00 hours. The hover 312 attribute indicates if the autonomous vehicle 116 is to hover when performing the action 308 at the location of the waypoint.

In an embodiment of the present invention, an unmanned aerial vehicle acts as the autonomous vehicle 116 and hover operation is performed by being in the air at an altitude without any movement at the waypoint 112. The autonomous vehicle 116 searches for a visual marker (not shown) using a camera 230 present on-board the autonomous vehicle 116 based on the check 314 attribute. The visual marker 232 is includes optical machine-readable data that may include, but is not limited to, Quick Response code or a Roundel when the corresponding action 308 is 'MEASURMENT'. The result of identification of one or more visual markers results in locating equipment, for example, equipment 114. In cases where the action 308 is 'PATROL', autonomous vehicle 116 records a video clip (not shown) using the camera 230 at the waypoint or while the autonomous vehicle 116 vehicle moves through the waypoint represented by the X 302, Y 304 and Z 306 coordinate. The camera 230 is capable of capturing a video clip or an image 242. The attribute WIFI 316 indicates the presence of wireless connectivity at a given waypoint represented by the X 302, Y 304 and Z 306 coordinates. The sensor type 318 attribute indicates the type of sensor to be used at the waypoint represented by the X 302, Y 304 and Z 306 coordinates to collect sensor data 226. Some example of sensors may include, but is not limited to, vibration sensor, temperature sensor, optical sensor or a biosensor. One or more of the sensors are activated based on the sensor type 118 attribute.

In another embodiment, first row of the trajectory database 222 as shown in FIG. 3 represents an initial waypoint 118 shown in FIG. 1 by the attributes X 302, Y 304 and Z 306 coordinates. When present at this waypoint, the action performed by the autonomous vehicle 116 is represented by the action 308 attribute. The action, in this example, is the attribute value 'LAUNCH'. The 'LAUNCH' action is performed at a particular time represented by the time 310 attribute. The autonomous vehicle 116 takes off from the waypoint during the 'LAUNCH' action. In this exemplary embodiment, the second row in the trajectory database 222 represents actions performed at waypoint 112 and the action 308 attribute contains the value 'MEASUREMENT'. In turn, the measurement is performed using the sensor indicated by the sensor type 318 attribute which is 'VIBRATION' thereby a vibration sensor is activated when the autonomous vehicle 116 reaches the waypoint 112. The second row of the trajectory database 222 contains a check 314 attribute that allows identification of equipment, for example, the equipment 114 present near waypoint 112 is identified using a Quick Response code as the value for the attribute is 'QR CODE'. The quick response code in this embodiment is located on the equipment 114 thereby allowing identification of the equipment.

Figure 4:
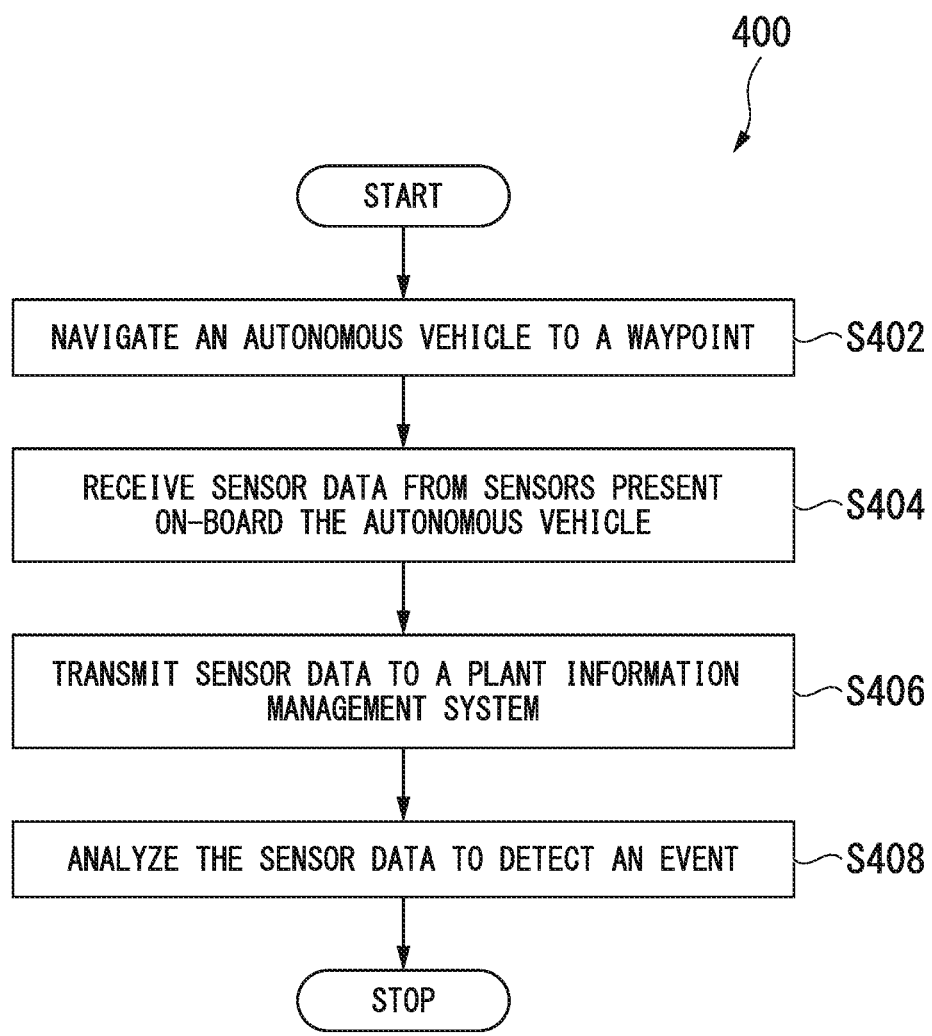
FIG. 4 is a flowchart representing steps involved in detecting an event, according to some embodiments of the present invention.

FIG. 4 is a flowchart representing steps involved in detecting an event (not shown), according to some embodiments of the present invention. In an embodiment of the present invention, at step S402, an autonomous vehicle 116 navigates to a waypoint using the aid of a three dimensional plant model (not shown) and a trajectory 126 that defines the set of waypoints the autonomous vehicle 116116 can pass through. The X 302, Y 304 and Z 306 coordinates in the trajectory database 222 is used by the autonomous vehicle to navigate from a waypoint, for example, the waypoint 118 to the waypoint 112.

At step S404, the autonomous vehicle 116 when present at the location of a waypoint, for example, at the waypoint 112, the autonomous vehicle 116 uses its on-board sensors to collect sensor data (not shown). The type of sensor used is decided based on the sensor type 218 attribute in the trajectory database 222. In an embodiment of the present invention, the sensor type 218 used by the autonomous vehicle 116 is a humidity sensor. In other embodiments of the present invention, a combination of one or more sensors may be used.

After collecting the sensor data 226, at step S406 a communication module 206 transmits the sensor data to the PIMS 122. In an embodiment of the present invention, the communication module 206 uses the wireless access point 103 to transmit the sensor data collected during its trajectory 126 through the waypoints 112 and 105. The sensor data is then stored in the master database 228.

The collected sensor data is analysed at step S408 by an analysis module 216. The analysis module uses sensor data previously stored, in other words historic sensor data, in master database 228 and compares them with the recently received non-historic sensor data to perform the analysis and detect an event. An example an event may include, but is not limited to, a defect in equipment based on abnormal reading from the received non-historic sensor data in comparison to historic sensor data stored in master database 228.

Figure 5:
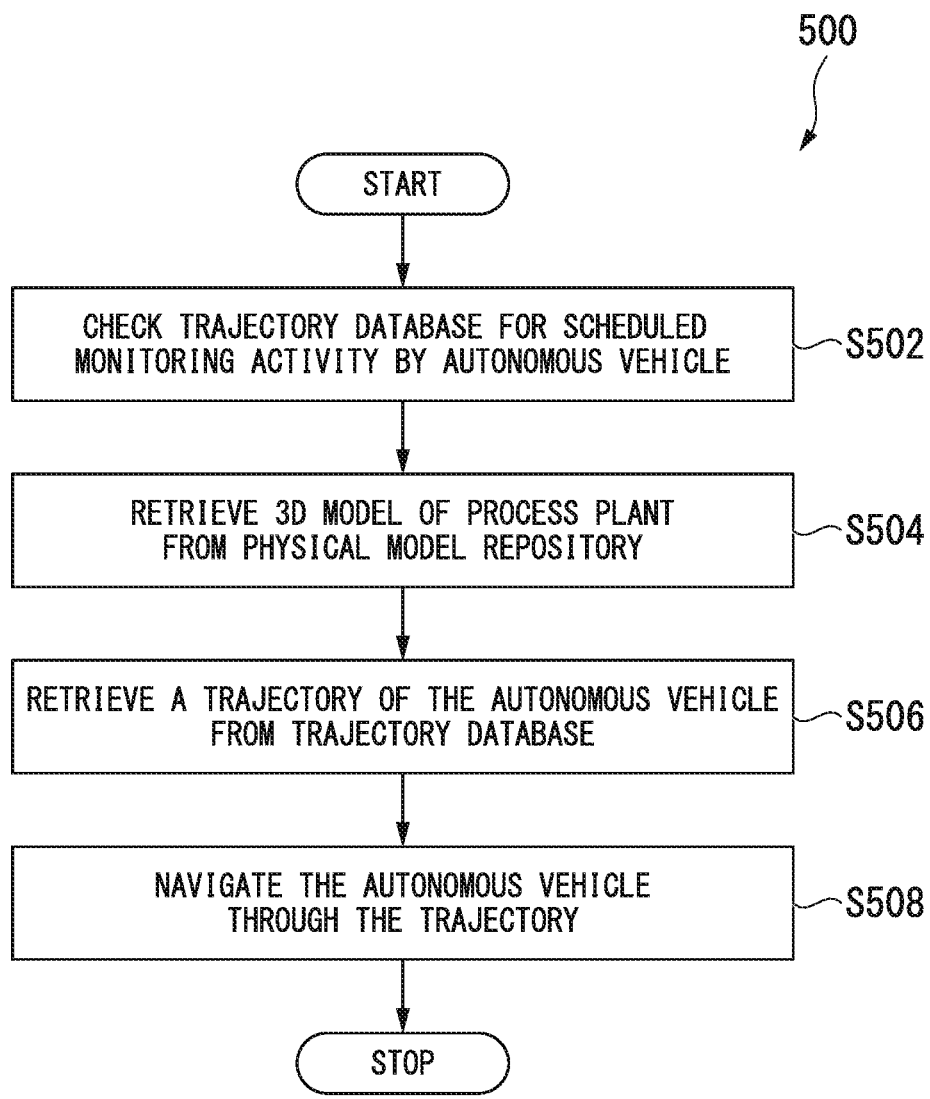
FIG. 5 is a flowchart showing acquisition of information required for an autonomous vehicle to navigate in a trajectory, according to an embodiment of the present invention.

FIG. 5 is a flowchart showing acquisition of information required for an autonomous vehicle 116 to navigate in a trajectory 126, according to an embodiment of the present invention. In an embodiment of the present invention, at step S502, a trajectory database 222 is checked for a scheduled monitoring activity by the autonomous vehicle 116. The activity 308 attribute is checked for the value 'LAUNCH' at regular intervals and when the current time matches the time 310 attribute, then the autonomous vehicle 116 is started for monitoring the industrial plant. In some embodiments, when the current time does not match the time 310 attribute when the autonomous vehicle 116 is located at a waypoint, then a warning alert is sent to a Human Machine Interface (HMI) 102 alerting an operator.

In another embodiment, the navigation module 218 is configured to generate an alert to a Human Machine Interface 102 in response to an external interference to the movement of the autonomous vehicle 116 in the trajectory 126. Examples of external interference may include wind or presence of unknown obstacles that lead to change in the path of the autonomous vehicle 116 in the trajectory 126.

In another embodiment, the autonomous vehicle may be started for monitoring activity by the operator using the HMI 102.

In some embodiments, the PIMS 122 sends a command to the autonomous vehicle 116 to start monitoring activity based on the time 310 attribute. One or more autonomous vehicles may be used in the industrial plant for monitoring activity.

At step S504, after monitoring is started, the autonomous vehicle 116 uses a communication module 206 to retrieve a three dimensional plant model (not shown) from a model repository 220. The three dimensional plant model is used by the autonomous vehicle as a reference to identify the waypoints and direct itself to the path defined in the trajectory database 222. The three dimensional plant model is also used to avoid obstacles when the physical location of walls, equipment and piping of the industrial plant are defined in the three dimensional plant model. This allows the autonomous vehicle 116, for example, an unmanned aerial vehicle to navigate with the knowledge of the known obstacles. In another embodiment, of the autonomous vehicle 116 that are not defined in the three dimensional plant model, an ultrasound sensor detects the presence of an unknown obstacle when there are obstacles in the trajectory 126. This allows the autonomous vehicle 116 to avoid unknown obstacles such human presence and a temporary or new structure in the industrial plant.

After retrieving the three dimensional plant model, the trajectory 126 as defined in the trajectory database 222 is retrieved, at step S506, by the autonomous vehicle 116 upon connecting to PIMS 122 using the communication network and based on a zone (not shown) representing a particular physical area of the industrial plant. In some embodiments, one or more autonomous vehicles retrieve respective trajectories based on their respective zone they are located in the industrial plant. The autonomous vehicle 116 uses the X 302, Y 304 and Z 306 coordinates defined in the trajectory database 222. With the use of X 302, Y 304 and Z 306 coordinates, the autonomous vehicle 116 is aware of the initial waypoint, in this example the waypoint 118, in the three dimensional coordinates and the next waypoint to navigate. When moving from the current waypoint 118 to a subsequent waypoint 112, the autonomous vehicle 116 avoids obstacle by using the three dimensional plant model that give the autonomous vehicle 116 the awareness of the physical characteristics of the industrial plant such as the walls, piping and equipment.

At step S508, the autonomous vehicle 116 moves through various waypoints as defined in the trajectory database 222 and perform the actions defined in the action 308 attribute present in the trajectory database 222. In an example based on the trajectory database 222 described in FIG. 3, the second row in the trajectory database 222 defines an action 308 to be performed at waypoint 112. The example data indicates the autonomous vehicle 116 to perform a measurement using a sensor wherein the sensor type 318 is a vibration sensor.

Figure 6:
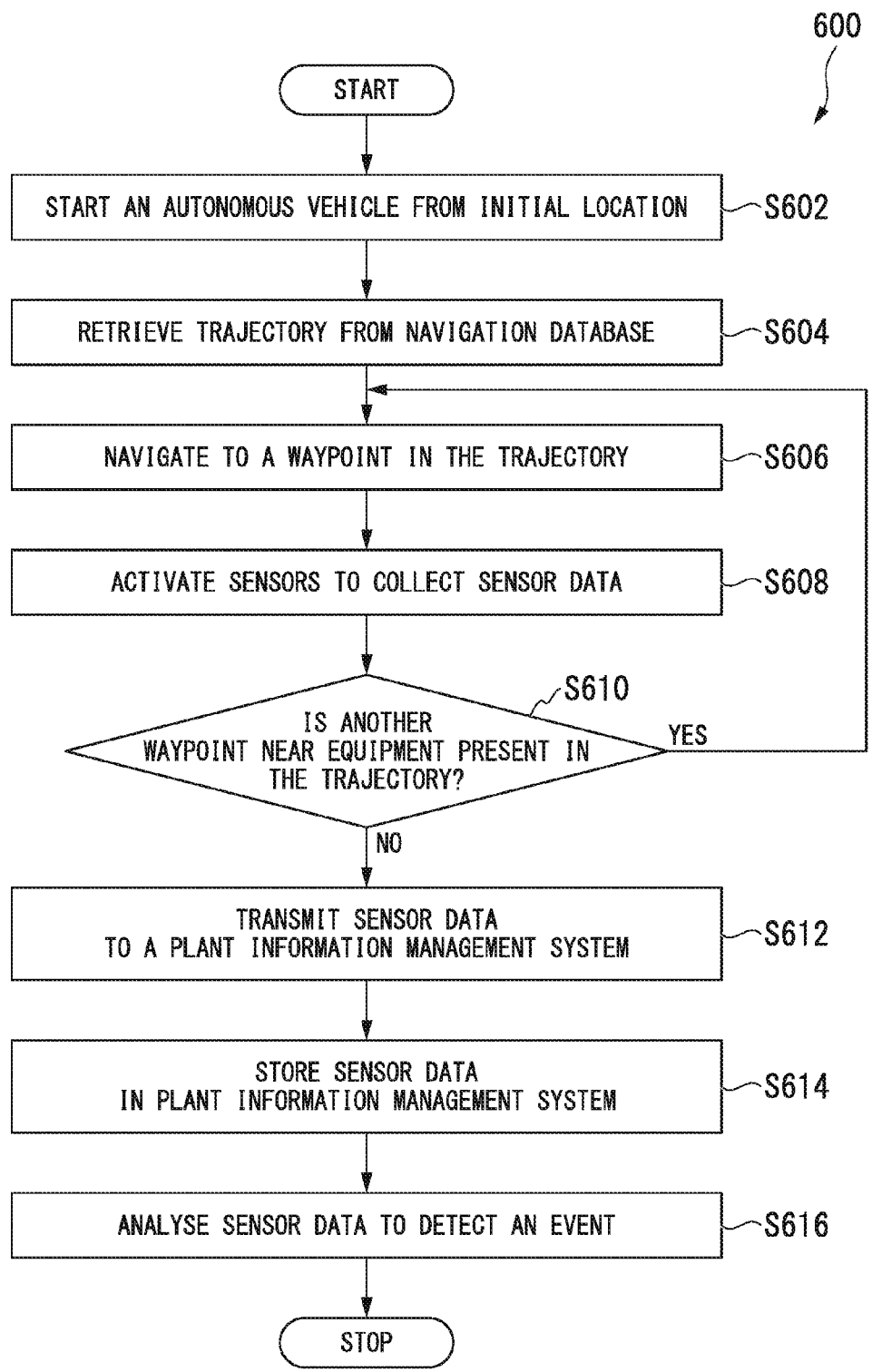
FIG. 6 is a flowchart showing actions performed by an autonomous vehicle resulting in detection of an event, according to some embodiments of the present invention.

FIG. 6 is a flowchart showing actions performed by an autonomous vehicle resulting in detection of an event, according to some embodiments of the present invention. According to an embodiment, an autonomous vehicle 116 is started and is connected to a wireless access point from an initial location, for example, at the waypoint 118 the autonomous vehicle 116 connects to the wireless access point 104 as shown in FIG. 1.

At step S602, the autonomous vehicle 116 is started. After starting the autonomous vehicle 116 and connecting to a communication network using the wireless access point 104, at step S604, the autonomous vehicle 116 retrieves a trajectory 126 from a trajectory database 222.

The autonomous vehicle 116, during step S606, uses the retrieved trajectory 126 to reach a waypoint, for example, the waypoint 112 that is adjacent to equipment 114. After reaching the waypoint 112, in this example, a sensor such as vibration sensor is activated at step S608 to collect sensor data at waypoint 112. It should be noted that the waypoint 112 is located in proximity to equipment 114 and therefore the vibration sensor makes vibration measurement related to the equipment 114.

After collecting the sensor data at the waypoint 112, at step S610, a check for the presence of subsequent waypoints in the trajectory 126 is performed. In an embodiment, this check is performed by looking up the information retrieved from the trajectory database 222 as indicated in the schema in shown in FIG. 3 for additional rows that indicate there are subsequent waypoints. In another embodiment, if there are additional waypoints near equipment in the trajectory, then the autonomous vehicle 116 navigates to the subsequent waypoint for collecting sensor data.

In some embodiments, when there are no subsequent waypoints near equipment, the autonomous vehicle 116 navigates to the last waypoint in the trajectory 126 in order to transmit the collected sensor data to the PIMS 122. This is because, in this example, the last waypoint 106 in the trajectory 126 is in proximity to the wireless access point. The last waypoint in the trajectory 126 is the waypoint 106 that has access to the wireless access point to transmit the sensor data to the PIMS 122 using the communication network, at step S612.

The sensor data sent from the autonomous vehicle 116 is stored in the master database 228 present in the PIMS 122 at step S614. The sensor data is subsequently analysed to detect an event. The steps involved in detection of the event, at step S616, are explained below in conjunction with FIG. 8.

Figure 7:
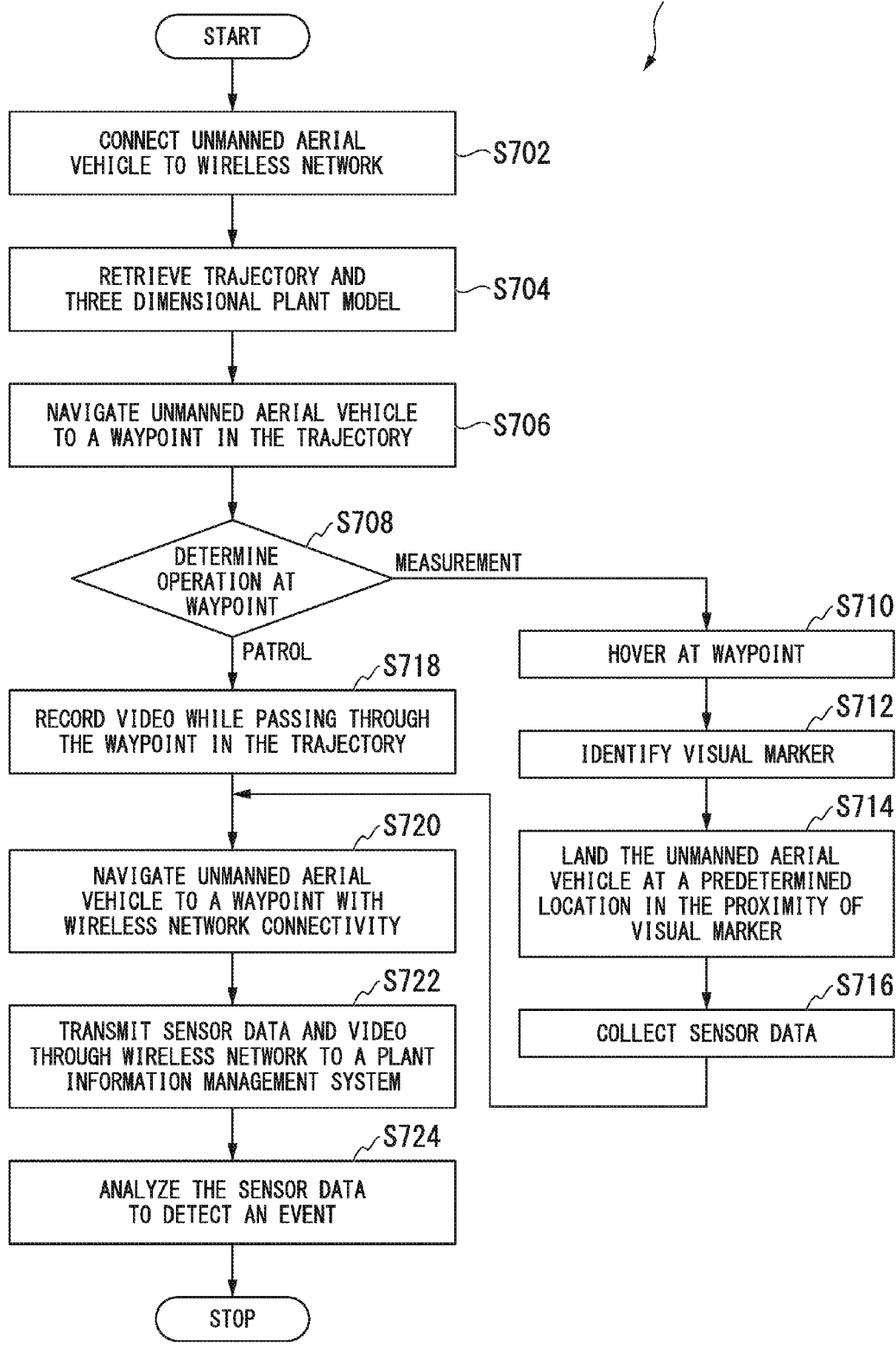
FIG. 7 is a flowchart showing an example of operations performed by the autonomous vehicle in accordance with an embodiment of the present invention.

FIG. 7 is a flowchart showing an example of operations performed by the autonomous vehicle in accordance with an embodiment of the present invention. In an embodiment of the present invention, an autonomous vehicle 116 can perform a flight through a trajectory 126. At step S702, the autonomous vehicle 116 is connected to a wireless network established by a wireless access point 104. In this example, the autonomous vehicle 116 is present at the waypoint 118. The waypoint 118 is within the range of the wireless network established from the wireless access point 104. This allows the autonomous vehicle 116 to communicate with the PIMS 122 through a communication network that connects the wireless access point 104 to the PIMS 122. An example of a communication network may include, but is not limited to, a process control network.

The autonomous vehicle 116 after connecting to the wireless network and thereby is connected to the PIMS 122 through the communication network. During step S704, the wireless network connectivity allows the autonomous vehicle to retrieve a three dimensional plant model from a model repository 220 and a trajectory 126 from the trajectory database 222. The autonomous vehicle 116, for example, an unmanned aerial vehicle will use the three dimensional plant model and the trajectory 126 to perform its flight through the various waypoints present in it in order to monitor the industrial plant. For example, the waypoints 118, 112, 105, and 106 in trajectory 126 (shown in FIG. 1) correspond to the rows of the trajectory database 222 as shown in FIG. 3.

After retrieving the trajectory 126, at step S706, the autonomous vehicle 116 performs a flight to the next waypoint present in the trajectory 126. The autonomous vehicle 116 starts from an initial location for which X, Y and Z coordinates are configured in the autonomous vehicle 116. In an embodiment shown in FIG. 1, the initial location is the waypoint 118. The autonomous vehicle uses the information retrieved from the trajectory database 222 to identify the next waypoint location in the X, Y and Z coordinates and navigates to the waypoints thereafter.

The autonomous vehicle 116 navigates from waypoint 118 to the subsequent waypoint, for example, the waypoint 112. At step S708, the autonomous vehicle 116 determines, by the use of information retrieved from the trajectory database 222, the operation to be performed at the waypoint 118. In an exemplary embodiment, the operation at waypoint 118 in this embodiment is either 'MEASUREMENT' or 'PATROL'.

If the operation at waypoint 118 is determined to be 'MEASUREMENT', then the autonomous vehicle 116 performs a hovering operation after reaching the waypoint 118 at step S710. In an unmanned aerial vehicle, hover operation means it is kept in flight at an altitude but without a movement in any of the X, Y or Z coordinates. When hovering, at step S710, the autonomous vehicle 116 uses a camera 230 to identify a visual marker 232 at step S712. An example of a visual marker is a Quick Response (QR) code, which identifies specific equipment such as equipment 114. For example, at waypoint 118, the camera 230 identifies a QR code placed on equipment 114 thereby identifying the equipment 114. The autonomous vehicle 116 is moved closer to the equipment 114 and is made to land at close proximity to the equipment 114, at step S714. The autonomous vehicle 116 is made to land in close proximity to the equipment 114, at step S716, a sensor 202 is activated to collect sensor data. An example of a sensor may include, but is not limited to, vibration sensor, humidity sensor, and temperature sensor. In another embodiment, the camera 230 can read the digital display present on a field device 110 and use optical character recognition to read the value shown on the digital display of the field device 110.

If the operation at waypoint 118 is determined to be 'PATROL', then at step 718 the autonomous vehicle 116 does not hover but it passes through the waypoint 112 following the trajectory 126 while at the same recording a video clip using the camera 230. The video clip recorded allows can be used to identify a physical security breach or any spill or leak in chemicals in an industrial plant. The analysis module 216 performs identification of a physical security breach or any spill or leak in the industrial plant. The steps involved in analysing a video clip are explained below in conjunction with FIG. 9.

In an embodiment, not all waypoints are within the range of the wireless network established using wireless access points 103 and 104. For example, in the environment 100, the waypoints 105 and 112 remain outside the range of the wireless network. Therefore, at step S720, the autonomous vehicle 116 navigates to a waypoint with wireless connectivity, for example, the waypoint 106 that is within the range of wireless access point 103.

Using the wireless access point 103, the autonomous vehicle 116 transmits, at step 722, the collected sensor data and the video clip to the PIMS 122 where it is stored in a master database 228.

At step 724, the sensor data is analysed by the analysis module to detect an event. The detailed steps involved in detecting an event is described below in conjunction with FIG. 8

Figure 8:
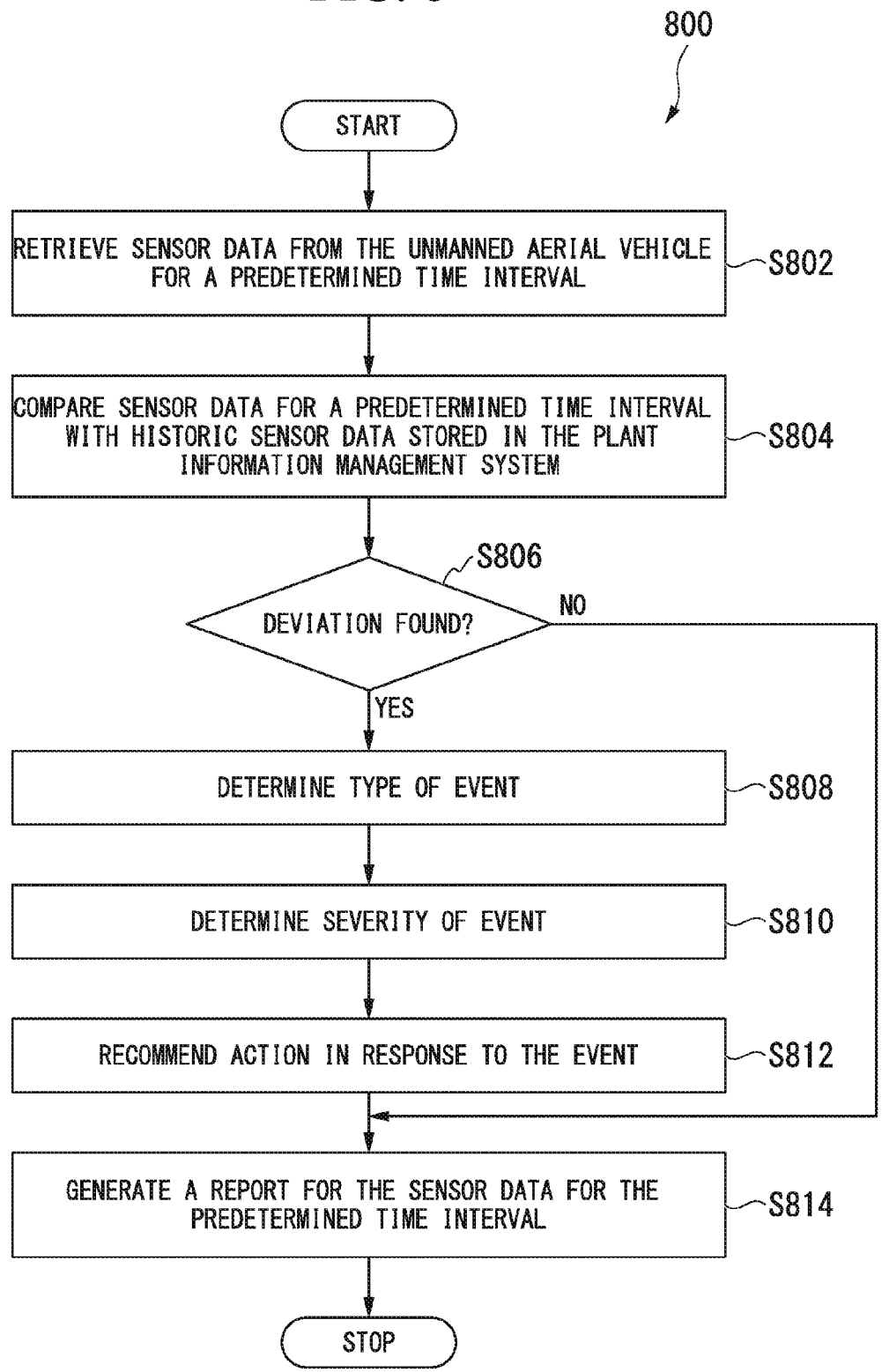
FIG. 8 is a flowchart representing generation of a report from the sensor data, according to some embodiments of the present invention.

FIG. 8 is a flowchart representing generation of a report from the sensor data, according to some embodiments of the present invention. In some embodiments of the present invention, at step 802, the analysis module 216 retrieves non-historic sensor data from an autonomous vehicle 116 for a predetermined time interval, for example, past twenty four hours. For example, a vibration sensor is used to collect sensor data at waypoint 112 for equipment 114.

The historic sensor data for the previous days is stored in the master database 228 of a PIMS 122. At step S804, the non-historic sensor data collected at waypoint 112 for equipment 114 is compared with historic sensor data averaged for a predetermined period, for example, past seven days from the same waypoint 112 for equipment 114.

During step S804, average of the historic sensor data for a predetermined period, for example, past seven days is compared with non-historic sensor data collected for a predetermined time interval, for example, past twenty four hours. Any deviation of the non-historic sensor data for the past twenty four hours from the average of the past seven days is calculated.

At step S806, an event is detected if there is a deviation found from the comparison at step S804. Depending on the sensor data collected using the vibration sensor the event can indicate a problem with the equipment. Some examples of the event may include, but is not limited to, an imbalance in rotating parts, a bearing defect, or a motor defect.

Upon determination of the event, the severity of the event is determined according to the amount of deviation found in S808. For example, if the vibration sensor data is 10% more than the average for the past seven days, the event is of severity Medium. If the vibration sensor data is 20% more than the average for the past seven days, the event is of severity high. If the vibration sensor data is 50% more than the average for the past seven days, the event is of severity critical.

After the severity of the event is determined, at step S808, an action is recommended in step S810. This action is based on the severity of the event. In an example, if the severity of the event is critical, then an immediate maintenance and shutdown is generated. If the severity of the event is high, a deferred maintenance request is generated. If the severity of the event is medium, a recommendation to watch the equipment 114 is generated.

At step S812, a report is generated using the severity of the event generated in step S808 and the recommended action in step S810. This report will be used during the maintenance of the industrial plant.

A report is generated, at step S814, if there is no deviation found from the comparison at step S804, mentioning that there is no deviation in the sensor data collected for the predetermined time interval. The presence of no deviation means the equipment 114 is operating without any problem or impending defect. This report is generated accordingly for the sensor data from the waypoint 112 corresponding to equipment 114.

Figure 9:
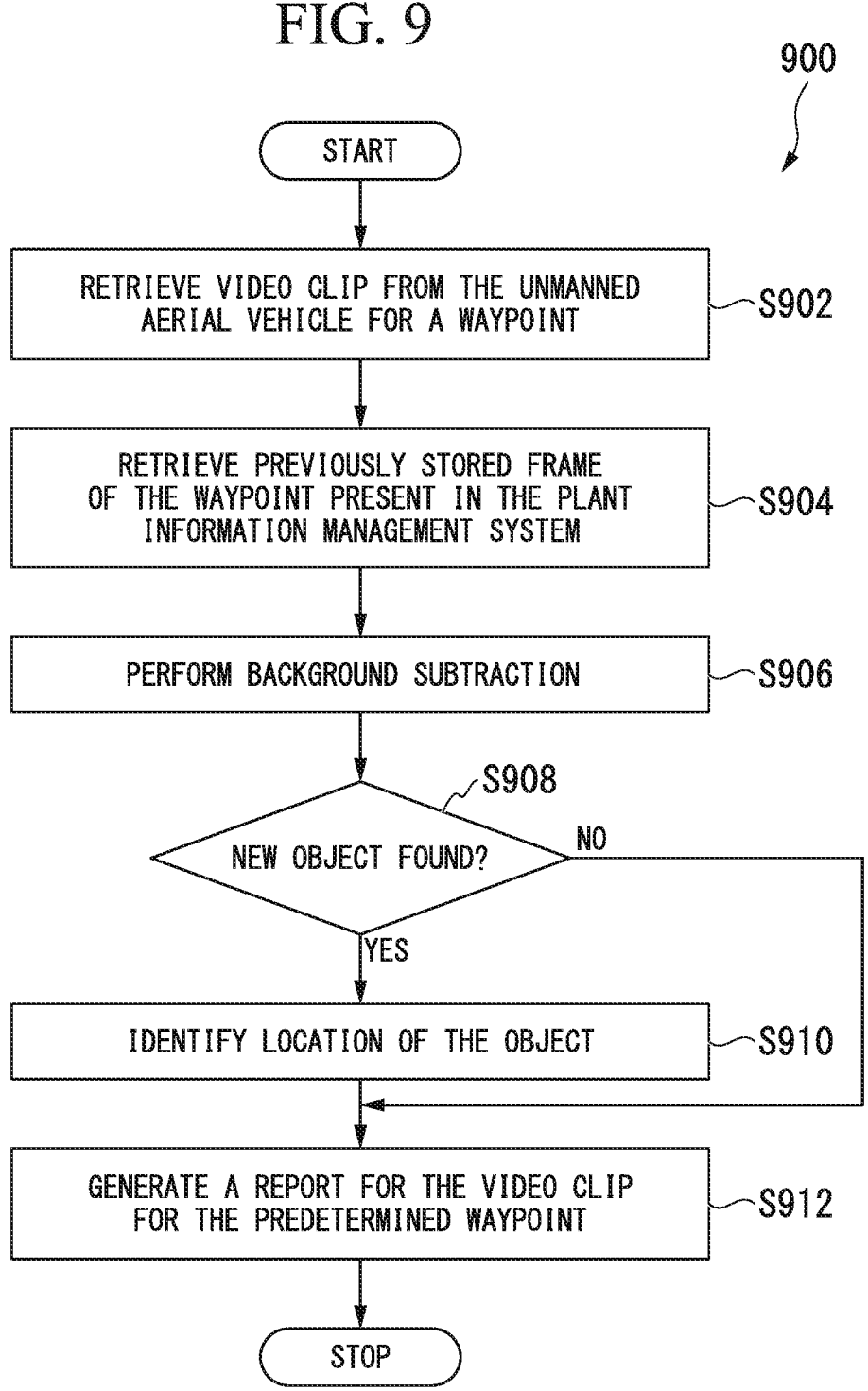
FIG. 9 is a flowchart representing generation of report from the video clip, according to some embodiments of the present invention.

FIG. 9 is a flowchart representing generation of report from the video clip, according to some embodiments of the present invention. In an embodiment of the present invention, the check 314 attribute shown in FIG. 3 allows the autonomous vehicle 116 to be configured to record a video clip at a waypoint represented by the X, Y and Z coordinates in the trajectory database 222. This is indicated by the presence of the value 'VIDEO' for check 314 attribute in the trajectory database 222. As explained earlier, if the operation at waypoint 118 is determined to be 'PATROL' then at step 718 as shown in FIG. 7 the autonomous vehicle 116 does not hover, but it passes through the waypoint 112 following the trajectory 126 while at the same recording a video clip using the camera 230. The video clip is transmitted through wireless network to a plant information management system 122 and stored in the master database 228.

At step S902, the analysis module 216 retrieves a video clip from the master database 228. The video clip includes a plurality of frames. A frame is an electronically coded still image in video technology. A current frame is selected from a video clip corresponding to the time 310 parameter. It should be noted that a video captured at a waypoint may capture equipment or physical space.

At step S904, the analysis module 216 retrieves a previously stored frame of the waypoint present in the master database 228. Subsequently, at step S906, a background subtraction operation is performed using the current frame and the previously stored frame of the waypoint. Background subtraction is performed in order to extract a foreground in comparison with a background, in this case a previously stored frame of the waypoint. In this operation, the current frame is compared with the previously stored frame by their pixel values.

At step S908, the presence of a new object is identified. A predetermined threshold representing the number of pixels that are different is used. When the number of pixel values that differ from the previously stored frame exceeds the predetermined threshold, the presence of a new object is identified in the current frame. It should be noted that the new object in this context could indicate a human presence in a secure zone or a chemical spill in the industrial plant.

At step S910, location of the new object is identified when the presence of a new object is identified in step S908. When a new object is determined to be present, the location of the new object on the current frame is identified by using the amount of pixel value difference on a portion of the current frame. The identification of the new object in the current frame may indicate a chemical leak in the equipment 114 present in proximity to the waypoint, for example, the waypoint 112.

The location of the new object in the current frame of the waypoint is added to the report generated, at step S912, for the video clip. In another embodiment, when a new object is found, the console operator may be alerted using the HMI 102.

A report is generated at step S912, if no new object is identified in the current frame during the pixel comparison operation stating the same.

Figure 10:
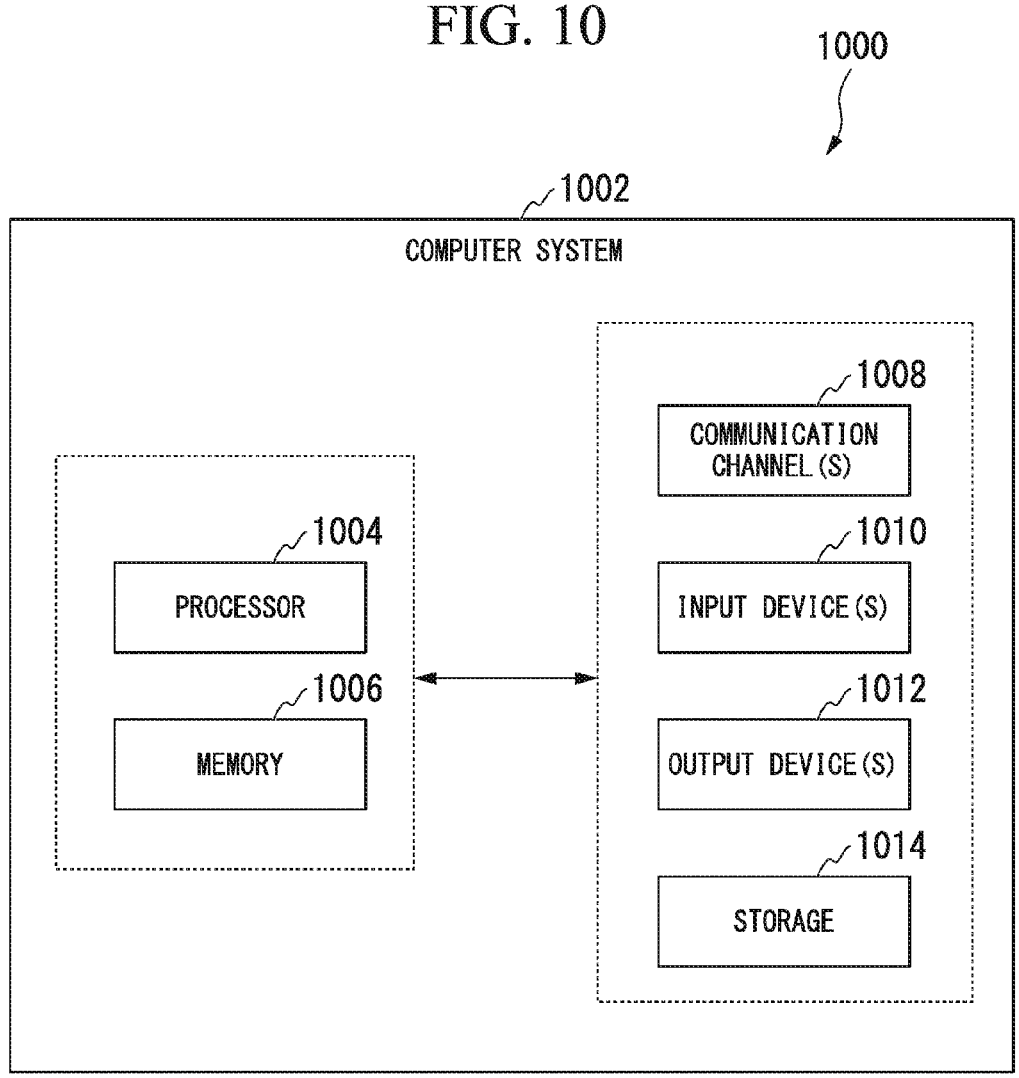
FIG. 10 illustrates an example of the system according to some embodiments of the present invention.

FIG. 10 illustrates an exemplary system 1000 in which some embodiments of the system are implemented.

The system 1002 may include at least one processor 1004 and at-least one memory 1006. The processor 1004 executes program instructions and may be a real processor. The processor 1004 may also be a virtual processor. The computer system 1002 is not intended to suggest any limitation as to scope of use or functionality of described embodiments. For example, the computer system 1002 may include, but not limited to, one or more of a general-purpose computer, a programmed microprocessor, a micro-controller, an integrated circuit, and other devices or arrangements of devices that are capable of implementing the steps that constitute the method of the present invention. In an embodiment of the present invention, the memory 1006 may store software for implementing various embodiments of the present invention. The computer system 1002 may have additional components. For example, the computer system 1002 includes one or more communication channels 1008, one or more input devices 1010, one or more output devices 1012, and storage 1014. An interconnection mechanism (not shown) such as a bus, controller, or network, interconnects the components of the computer system 1002. In various embodiments of the present invention, operating system software (not shown) provides an operating environment for various software executing in the computer system 1002, and manages different functionalities of the components of the computer system 1002.

The communication channel(s) 1008 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, the Bluetooth or other transmission media.

The input device(s) 1010 may include, but not limited to, a touch screen, a keyboard, mouse, pen, joystick, trackball, a voice device, a scanning device, or any another device that is capable of providing input to the computer system 1002. In an embodiment of the present invention, the input device(s) 1010 may be a sound card or similar device that accepts audio input in analogue or digital form. The output device(s) 1012 may include, but not limited to, a user interface on CRT or LCD, printer, speaker, CD/DVD writer, or any other device that provides output from the computer system 1002.

The storage 1014 may include, but not limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1002. In various embodiments of the present invention, the storage 1014 contains program instructions for implementing the described embodiments.

The present invention may be implemented in numerous ways including as a system, a method, or a computer program product such as a computer readable storage medium or a computer network wherein programming instructions are communicated from a remote location. The autonomous vehicle 116 and the plant information management systems 122 are computing devices with networking capabilities.

The disclosure of the present invention may suitably be embodied as a computer program product for use with the computer system 1002. The method described herein is typically implemented as a computer program product, including a set of program instructions which is executed by the computer system 1002 or any other similar device. The set of program instructions may be a series of computer readable codes stored on a tangible medium, such as a computer readable storage medium (storage 1004), for example, diskette, CD-ROM, ROM, flash drives or hard disk, or transmittable to the computer system 1002, via a modem or other interface device, over either a tangible medium, including but not limited to optical or analogue communications channel(s) 1008. The implementation of the invention as a computer program product may be in an intangible form using wireless techniques, including but not limited to microwave, infrared, bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

In general, the systems, devices, modules and methods in the above-described embodiments may be deployed in part or in whole through a machine that executes computer software, software components, program codes, and/or instructions on one or more processors. The one or more processors may be part of a general-purpose computer, a server, a cloud server, a client, network infrastructure, mobile computing platform, stationary computing platform, or other computing platform. One or more processors may be any kind of computational or processing device or devices which are capable of executing program instructions, codes, binary instructions and the like. The one or more processors may be or include a signal processor, digital processor, embedded processor, microprocessor or any variants such as a co-processor, for example, math co-processor, graphic co-processor, communication co-processor and the like that may directly or indirectly facilitate execution of program codes or program instructions stored thereon. In addition, the one or more processors may enable execution of multiple programs, threads, and codes. The threads may be executed simultaneously to enhance the performance of the one or more processors and to facilitate simultaneous operations of the application. Program codes, program instructions and the like described herein may be implemented in one or more threads. The one or more processors may include memory that stores codes, instructions and programs as described herein. The processor may access a non-transitory processor-readable storage medium through an interface that may store codes, instructions and programs as described herein and elsewhere. The non-transitory processor-readable storage medium associated with the processor for storing programs, codes, program instructions or other type of instructions capable of being executed by the computing or processing device may include but may not be limited to one or more of a memory, hard disk, flash drive, RAM, ROM, CD-ROM, DVD, cache and the like.

A processor may include one or more cores that may enhance speed and performance of a multiprocessor. In some embodiments, the process may be a dual core processor, quad core processors, other chip-level multiprocessor and the like that combine two or more independent cores.

The methods, modules, devices, and systems described herein may be deployed in part or in whole through a machine that executes computer software on a server, client, firewall, gateway, hub, router, or other such computer and/or networking hardware.

The software program may be associated with one or more client that may include a file client, print client, domain client, internet client, intranet client and other variants such as secondary client, host client, distributed client and the like. The client may include one or more of memories, processors, computer readable media, storage media, physical and virtual ports, communication devices, and interfaces capable of accessing other clients, servers, machines, and devices through a wired or a wireless medium, and the like. The programs or codes as described herein may be executed by the client. In addition, other devices required for execution of methods as described in this application may be considered as a part of the infrastructure associated with the client. The client may provide an interface to other devices including servers, other clients, printers, database servers, print servers, file servers, communication servers, distributed servers and the like. This coupling and/or connection may facilitate remote execution of program across the network. The networking of some or all of these devices may facilitate parallel processing of a program or method at one or more location. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The software program may be associated with one or more servers that may include a file server, print server, domain server, internet server, intranet server and other variants such as secondary server, host server, distributed server and the like. The server may include one or more of memories, processors, computer readable media, storage media, physical and virtual ports, communication devices, and interfaces capable of accessing other servers, clients, machines, and devices through a wired or a wireless medium, and the like. The methods, programs or codes as described herein may be executed by the server. In addition, other devices required for execution of methods as described in this application may be considered as a part of the infrastructure associated with the server. The server may provide an interface to other devices including clients, other servers, printers, database servers, print servers, file servers, communication servers, distributed servers, social networks, and the like. This coupling and/or connection may facilitate remote execution of program across the network. The networking of some or all of these devices may facilitate parallel processing of a program or method at one or more locations. Any of the devices attached to the server through an interface may include at least one storage medium capable of storing programs, codes and/or instructions. A central repository may provide program instructions to be executed on different devices. In this implementation, the remote repository may act as a storage medium for program codes, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the arts. The computing and/or non-computing devices associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein may be implemented on any available cellular networks having multiple cells or non-cellular networks such as Wi-Fi. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, computer software, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory, for example, USB sticks or keys, floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The modules, engines, components, and elements described herein, including in flow charts and block diagrams throughout the figures, imply logical boundaries between the modules, engines, components, and elements. However, according to software or hardware engineering practices, the modules, engines, components, and elements and the functions thereof may be implemented on one or more processors, computers, machines through computer executable media, which are capable of executing program instructions stored thereon as a monolithic software structure, as standalone software modules, or as modules that employ external routines, codes, services, or any combination of these, and all such implementations may be within the scope of the present disclosure. Examples of such machines may include, but is not limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, processor-embedded eyewear and the like. Furthermore, the modules, engines, components, and elements in the flow chart and block diagrams or any other logical component may be implemented on one or more machines, computers or processors capable of executing program instructions. Whereas the foregoing descriptions and drawings to which the descriptions have been referred set forth some functional aspects of the disclosed systems, no particular arrangement of software for implementing these functional aspects should be inferred from these descriptions unless explicitly stated or otherwise clear from the context. It will also be appreciated that the various steps identified and described above may be varied, and that the order of steps may be adapted to particular applications of the techniques disclosed herein. All such variations and modifications are intended to fall within the scope of this disclosure. The descriptions of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

The invention claimed is:

1. A method for monitoring an industrial plant, the method comprising:
retrieving, by a navigation module of a handheld device, a trajectory from a trajectory database, the trajectory database storing location of waypoints and predetermined actions to be performed by an autonomous vehicle;
retrieving, by the navigation module of the handheld device, a model of the industrial plant from a model repository to which the handheld device is in communication over a communication network, wherein the model repository stores information about physical attributes of plant building and equipment and respective locations of the plant building and equipment;
navigating, by the navigation module, the autonomous vehicle to a waypoint present in the trajectory that is retrieved by the navigation module of the handheld device, wherein the waypoint is identified with respect to the model of the industrial plant from the model repository;
collecting sensor data, by at least one sensor at the waypoint;
receiving the sensor data, by a communication module of the handheld device, from the at least one sensor;
transmitting, by the communication module of the handheld device, the sensor data to an analysis module of a plant information management system configured to communicate with the handheld device; and
detecting, by the analysis module of the plant information management system, an event related to the industrial plant based on historic sensor data and non-historic sensor data, wherein the non-historic sensor data is the received sensor data that was generated by the at least one sensor on the autonomous vehicle, the historic sensor data had been generated by the at least one sensor on the autonomous vehicle before the non-historic sensor data was generated by the at least one sensor on the autonomous vehicle.

2. The method as claimed in claim 1, further comprising comparing the non-historic sensor data with the historic sensor data to identify a deviation between the historic sensor data and non-historic sensor data.

3. The method as claimed in claim 2, wherein the event is detected based on a magnitude of the deviation identified.

4. The method as claimed in claim 3, further comprising generating a recommended action corresponding to the magnitude of the deviation identified.

5. The method as claimed in claim 1, wherein one or more waypoints are associated with a trajectory travelled by the autonomous vehicle.

6. The method as claimed in claim 1, wherein the autonomous vehicle is one of an unmanned aerial vehicle and an unmanned ground vehicle.

7. The method as claimed in claim 1, further comprising identifying the waypoint using at least one visual marker located at the waypoint.

8. The method as claimed in claim 7, wherein the visual marker comprises optical machine-readable data.

9. The method as claimed in claim 1, wherein the waypoint is at least one of a plant safety zone and a location of equipment in the industrial plant.

10. The method as claimed in claim 1, wherein the at least one sensor is at least one of an infrared camera, a gas analyser, a vibration sensor, a sound sensor, an ultrasound sensor, and a Radio-Frequency Identification tag reader.

11. The method as claimed in claim 1, wherein the at least one sensor is configured to communicate with a field device in the industrial plant using near field communication (NFC).

12. An industrial plant monitoring system configured to monitor an industrial plant, the industrial plant monitoring system comprising:
    one or more processors;
    a trajectory database that stores location of waypoints and predetermined actions to be performed by an autonomous vehicle;
    a model repository that stores information about physical attributes of plant building and equipment and respective locations of the plant building and equipment;
    a handheld computer configured to communicate with the trajectory database and the model repository, the handheld computer comprising one or more processors configured to:
      retrieve a trajectory from the trajectory database;
      retrieve a model of the industrial plant from the model repository; and
      navigate the autonomous vehicle including at least one sensor to a waypoint using the trajectory that is retrieved by the handheld computer, wherein the waypoint is identified with respect to the model of the industrial plant from the model repository;
    a communication hardware module configured to receive sensor data from the at least one sensor; and
    a plant information management server configured to communicate with the handheld computer, the plant information management server comprising an analysis module configured to:
      receive the sensor data, by the communication module, from at least one sensor;
      detect an event related to the industrial plant based on historic sensor data and non-historic sensor data, wherein the non-historic sensor data is the received sensor data that was generated by the at least one sensor on the autonomous vehicle, the historic sensor data had been generated by the at least one sensor on the autonomous vehicle before the non-historic sensor data was generated by the at least one sensor on the autonomous vehicle.

13. The system as claimed in claim 12, wherein the handheld computer is configured to identify the waypoint using at least one visual marker present at the waypoint.

14. The system as claimed in claim 13, wherein the visual marker comprises optical machine-readable data.

15. The system as claimed in claim 12, further comprising a Human Machine Interface (HMI) for configuring a trajectory travelled by the autonomous vehicle, wherein the trajectory is associated with one or more waypoints.

16. The system as claimed in claim 12, wherein the handheld computer is configured to generate an alert to a Human Machine Interface in response to an external interference to a movement of the autonomous vehicle in the trajectory.

17. The system as claimed in claim 12, wherein the communication hardware module is configured to transmit the received sensor data when the autonomous vehicle is located in at least one waypoint.

18. The system as claimed in claim 12, wherein the communication hardware module is configured to transmit the sensor data using at least one of Wireless Local Area Network, Wireless Mobile Network, or Bluetooth protocol.

19. The system as claimed in claim 12, further comprising: the autonomous vehicle comprises the at least one sensor.

20. The system as claimed in claim 19, wherein the at least one sensor comprises at least one of an infrared camera, a gas analyser, a vibration sensor, a sound sensor, an ultrasound sensor, and a Radio Frequency Identification tag reader.

21. The system as claimed in claim 12, wherein the autonomous vehicle further comprises one or more processors configured to perform navigation and the communication hardware module.

22. The autonomous vehicle as claimed in claim 21, wherein the communication hardware module is further configured to transmit the sensor data to a master database.

23. The autonomous vehicle as claimed in claim 21, further comprising a camera configured to capture a video clip of the waypoint.

24. An autonomous vehicle comprising:
    a communication hardware module configured to communicate with a plant information management server comprising an analysis module and a trajectory database;
    one or more processors configured to:
      retrieve a trajectory from the trajectory database; and
      navigate the autonomous vehicle to a waypoint using the retrieved trajectory, wherein the waypoint is identified with respect to a model of an industrial plant from a model repository to which a handheld computer is in communication over a communication network, wherein the model repository stores information about physical attributes of plant building and equipment and respective locations of the plant building and equipment; and
    at least one sensor configured to collect sensor data at the waypoint;
    wherein the communication hardware module is configured to communicate with the at least one sensor and transmit the sensor data to the analysis module.

* * * * *